(12) United States Patent
Mori

(10) Patent No.: US 6,328,267 B1
(45) Date of Patent: *Dec. 11, 2001

(54) ARM SUPPORT AND PAD FOR MOUSE USING THE SAME

(75) Inventor: Makoto Mori, Katsushika-ku (JP)

(73) Assignee: Carl Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,471

(22) Filed: Dec. 9, 1999

(30) Foreign Application Priority Data

Dec. 14, 1998 (JP) .................................................. 10-354361

(51) Int. Cl.⁷ ...................................................... B43L 15/00
(52) U.S. Cl. ........................ 248/118.5; 248/118; 400/715
(58) Field of Search ................................. 248/118, 118.1, 248/118.5, 118.3, 918, 424, 425, 415, 416, 429, 430; 400/715; 108/142, 120; 403/59, 61, 70

(56) References Cited

U.S. PATENT DOCUMENTS

| | | | |
|---|---|---|---|
| 568,380 | * | 9/1896 | Theiring ............................ 248/118.1 |
| 4,504,715 | * | 3/1985 | Jorgensen et al. ................. 108/20 X |
| 4,566,664 | * | 1/1986 | Donald ................................. 248/349 |
| 4,635,894 | * | 1/1987 | Sammons ............................. 248/558 |
| 4,746,781 | * | 5/1988 | Dalquist, III et al. ........... 108/142 X |
| 4,946,127 | * | 8/1990 | Kulaga ................................. 248/551 |
| 5,149,043 | * | 9/1992 | Grundmann ........................ 248/349 |
| 5,927,663 | * | 7/1999 | Tseng ................................ 248/118.5 |
| 6,102,345 | * | 8/2000 | Mori ................................. 248/118.5 |

\* cited by examiner

Primary Examiner—Ramon O. Ramirez
Assistant Examiner—Tan Le
(74) Attorney, Agent, or Firm—Oliff & Berridge, PLC

(57) ABSTRACT

An arm support 4 which is formed by placing the displacing stand 6 provided with the boss portion on the fixed stand 5 on the surface of which is formed with a hole and the pad body 28 are coupled with the recessed portions formed on the pad stand 26. Thereby, the displacing stand 6 is enabled to displace in parallel and rotate on the fixed stand 5, which causes to be miniaturized in its total size. Further, when operating a mouse by placing an arm on the arm support 4, since the arm does not rub the table on which the pad stand is placed and the wrist including shoulder move in association with each other, resulting in reducing the fatigue of arm and increasing the working efficiency.

6 Claims, 9 Drawing Sheets

ARM SUPPORT AND PAD FOR MOUSE USING THE SAME

BACKGROUND OF THE INVENTION

1. Field of the Invention

The present invention relates to an arm support stand and a pad for a mouse using such the arm support. In general, when operating something on a table or desk, for instance whendepicting a linear line using a scale, operating a keyboard of such as personal computer or operating a mouse for personnel computer, it is often carried out by floating an elbow from the desk, and since, in such a case, the arm is easily to be fatigued, the elbow is apt to be put on the desk, so that movement of the arm becomes awkward.

The present invention relates to an arm support for helping of the above arm operation and a pad for a mouse using the same.

2. Prior Art

As an example when operating something on the desk by hand, in particular, when operating a mouse for a personal computer, it has been adapted to be carried out by putting a sponge or gum pad on the desk and while resting an arm or floating the arm on the desk. Further, it has been known that, in place of putting an elbow (arm) on the desk, an elbow is put on a stand which can be displaced on the desk in front and behind or left and right and to operate the mouse.

As a conventional art in which a stand is free to move in a plane what is shown in FIG. 18 is known. To this now an explanation is applied, first, a pair of rails 1 is provided, on these rails 1 a pair of displacing rails 2 is movably provided in the A direction and further on these rails 2 a displacing stand 3 is provided movably in the direction B. Thereby, in the combination of displacing directions A of the rails 2 and B of the displacing stand 3, the displacing stand 3 can move free in an arbitrary direction in a plane.

As mentioned above, when an elbow which is the side of the arm to operate a mouse is put on the desk or even when such elbow is floating, a load is on such arm. Then, such displacing stand 3 as shown in FIG. 18 has been considered.

However, in operation of a personal computer when an arm to operate a mouse is put on the displacing stand, the movement of the arm is requested to move not only in parallel but also in a rotary in the plane. Therefore, in case of using this displacing stand 3 for operation of the mouse this conventional displacing stand 3 can not rotate without changing the position on the rails, so that the operation of the mouse becomes difficult, which causes the arm to be tired, and an efficiency of the operation is not increased. In addition, scrubbing between the displacing stand 3 and the arm on the displacing stand 3 to cause the sleeve or the elbow to be stained.

Further, in FIG. 18, in the case where the length of the rails 1 and the displacing rails 3 are made to be approximately even to the one of each side of the displacing stand 3 and the whole is down sized, the displacing area of the displacing stand 3 in the plane becomes narrow which is not practical, and in the case where the length of the rails 1 and the displacing rails 2 is made to be lengthened to the displacing stand 3, thereby to the length from the elbow to the hand to hold the mouse the rails becomes an obstacle to make difficult the mouse moved, to deteriorate the efficiency.

The present invention is to provide an arm putting stand in which, in operating a mouse, the displacing stand does not become an obstacle and possible to be displaced in parallel and rotated to reduce the tiredness and a pad for use a mouse.

SUMMARY OF THE PRESENT INVENTION

In order to solve the above problem according to a first aspect of the present invention, in an arm putting stand, a plurality of balls are disposed annularly, on a fixed stand and at the center of the annular balls of the fixed stand an opening is formed, a displacing stand is supported on the plurality of balls, a boss portion is projected from the bottom of the displacing stand through the opening and a back plate which is not possible to come through the opening is fixed to the lower tip end of the boss.

According to a second aspect of the present invention, in the first aspect of the present invention, within the annularly disposed balls a plurality of openings are provided in the displacing stand, and corresponding to the plural holes a plurality of bosses are projected from the bottom of the displacing stand and are made to come through the openings loose and on each lower tip end of the bosses back plates are fixed in order to prevent the back plates from coming through the plural openings respectively.

According to a third aspect of the present t invention, in the first or second aspect of the present invention, the lower end of the boss is projected a little from the rear surface of the fixed stand.

According to a fourth aspect of the present invention, in the first or second aspect of the present invention, the fixed stand is provided with a mounting portion to mount the fixed stand on a placing stand (operation potion).

According to a fifth aspect of the present invention, in a pad for a mouse using an arm support, on a plane pad stand a recess for an arm support and a recess for pad body, and the arm support and the pad body are coupled respectively.

Further, according to a sixth aspect of the present invention, in a pad for mouse, on one end the pad for mouse is provided with a hole, an arm support is adapted to be coupled with the hole.

Further, according to a seventh aspect of the present invention, in a pad for a mouse, a plane pad stand provided with a recess for a pad body is provided with a fixed stand for an arm support in a unitary manner.

According to an eighth aspect of the present invention, in a pad for mouse, a placing stand with a recess for an arm support and a pad body are combined.

When supplementarily stating the above, in the first aspect, since a displacing stand of the arm support is disposed on a plurality of balls, a parallel displacing and rotation of the displacing stand becomes possible, due to the size of the opening pierced the fixed stand, the displacing of the boss portion is limited. Further, the back plate is adapted to be sized to prevent from coming through the hole of the fixed plate removing from the fixed plate. In order to make a little gap between the rear surface of the fixed plate and the back plate, the boss itself is made to be a little lengthened or by arranging the length by washer to projected a little from the opening.

Further, the balls, boss portions and openings can be accommodated in the fixed plate and the displacing plate to miniaturize the whole. Further, since the load of the arm hangs on the displacing stand, when setting the fixed stand on the table the rear side of the fixed stand is provided with a stopper and a positioning recess.

In the second aspect, the back plate may be mounted over a plurality of boss portions to connect the displacing stand and the fixed stand.

Next, in the sixth aspect of the present invention, since the pad body is provided with the holes for coupling the arm support, it may become easy to position the arm support to the pad body.

EMBODIMENT

Figures 1A, 1B:
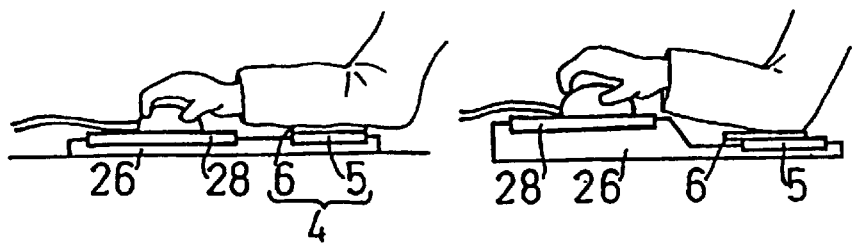
FIG. 1 are schematic diagrams (A) and (B) showing the operation manner of a mouse using the arm support of the embodiment of the present invention.

As shown in FIGS. 1(A) and (B), an arm support 4 is to support the arm to operate a mouse for a computer, which approximately is formed from a fixed stand 5 and a displacing stand 6.

Figure 2:
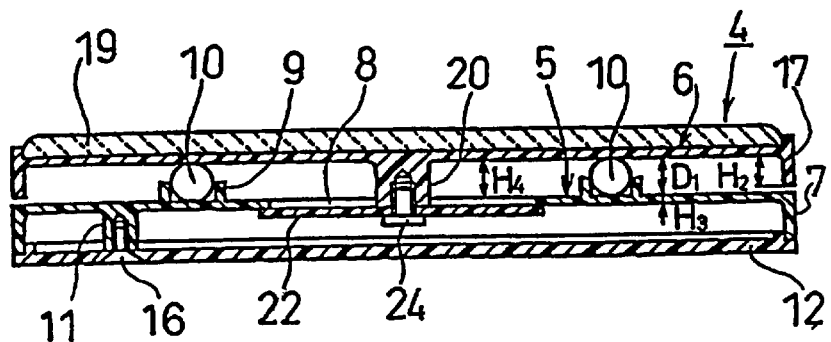
FIG. 2 is a vertical view of the arm support in section.
Figure 4:
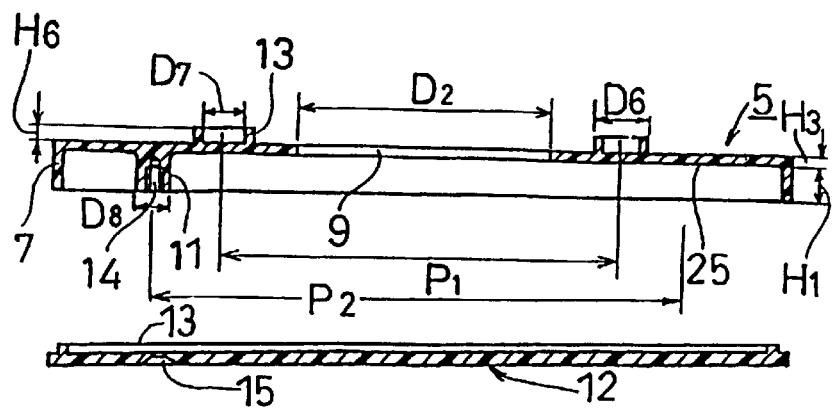
FIG. 4 is a vertical view of the fixed stand and the back plate of FIG. 2 in section.
Figure 5:
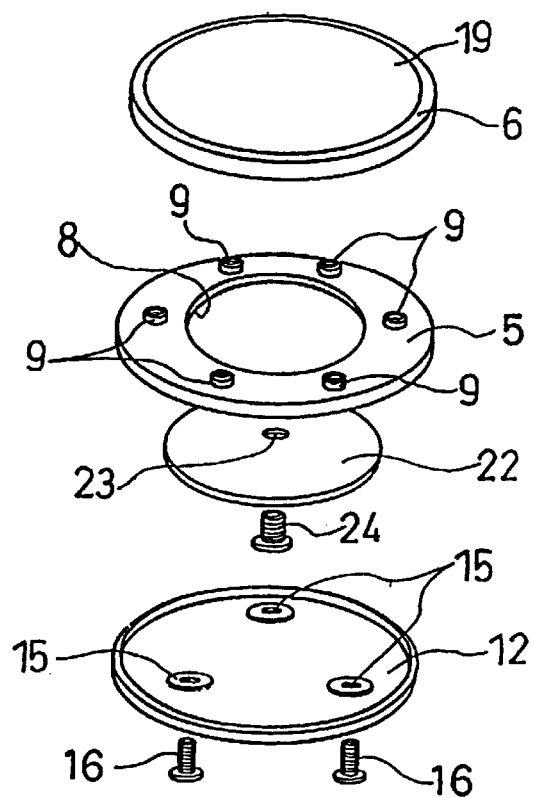
FIG. 5 is a broken perspective view of the arm support of FIG. 2.

As shown in FIGS. 2, 4 and 5, a sectional configuration of the circular fixed stand 5 which forms the lower portion of the arm support 4 is in such a manner as a circumferential side edge 7 extends downward to make a height H1 and under the ceiling a spacing where later mentioned a back plate 22 can be displaced is provided. At the center portion of the fixed stand 5, an opening 8 is provided, around the opening 8 a plurality of ball receptors 9 are disposed annularly (pitch circle diameter P1) and the balls 10 are accommodated.

As shown in FIG. 4, from the ceiling of the fixed stand 5, a plurality of bosses 11 having the height H1 same to the side edge 7 are projected and annularly (pitch circle diameter P2) disposed. The lower ends of the side edge 7 and the bosses 11 abut to the bottom plate 12, on the bottom plate 12, a flange 13 which couples with the inner circumferential surface of the fixed stand 5 is formed. By connecting the fixed stand 5 to the bottom plate 12 with a screw 16 through a screw hole 14 provided on the boss 11 of the fixed stand 5 and a screw receptor 15 provided on the bottom plate 12 to form a spacing.

Figure 3:
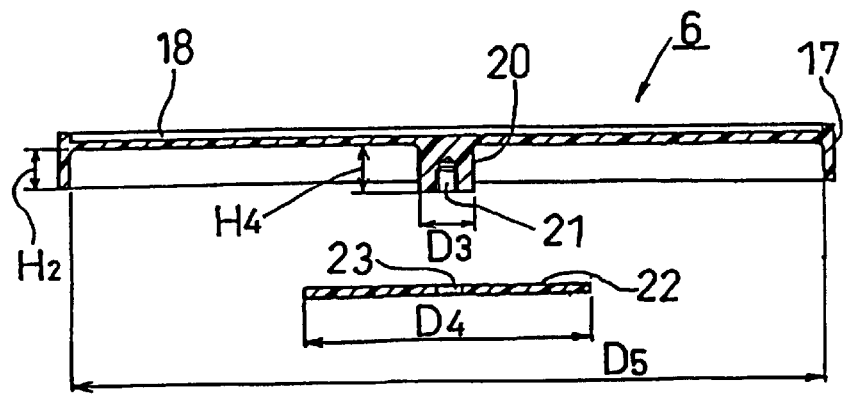
FIG. 3 is vertical views of the displacing stand and the back plate of FIG. 2 in section.

As shown in FIGS. 1, 3 and 5, the sectional configuration of the displacing stand 6 is formed in such a manner as the side edge 17 of a plane ceiling is extended downward to form a height of H2 and when assembling with the fixed stand 5, a portion under the ceiling of the displacing stand 6 forms an accommodation room for the balls 10, which may improve an outer appearance, and the displacing stand is adapted to roll on the balls 10 free to be displaced in parallel and rotated in the plane. Further, an upper surface 18 is concave to which a pad 19 is adapted to be attached. And, at the center of the displacing stand 6, a boss portion 20 is projected downward and a screw hole 21 is provided, the circular back plate 22 is fixed to the boss portion 20 the screw 24 is inserted through a screw through hole 23 and fixed to the boss portion 20. Now, the back plate 22 may be configured differently if it does not come through the opening 8.

Here, if arranging the size figures of the ceiling portion thickness of the fixed stand 5 as H3, the height of the side edge 17 of the displacing stand 6 as H2, the height of the boss portion 20 as H4 and the diameter of the ball 10 as D1, the following two formulae are obtained.

$$H4 > H3 + D1, \quad H2 < D1$$

For reference, when the ball receptor 9 becomes bottom-up (height:h), if the diameter of the ball is made to be d, the formula becomes H2<(h+d)

The boss portion 20 provided on the displacing stand 6 is inserted through the hole pierced the fixed stand 5, the diameter D2 of the hole 8 provided on the fixed stand 5 is adapted to make larger than the diameter D3 of the boss portion 20, the diameter D4 of the back plate 22 connected to the displacing stand 6 is adapted to make larger than the diameter D2 of the hole 8 provided on the fixed stand 5. If represented by a formula, it becomes D2<D4. Accordingly, in the state where the back plate 22 is connected to the boss portion 20, the back plat 22 is not drawn out of the hole 8, so that, as shown in FIG. 2, the fixed stand 5 and the displacing stand 6 becomes in a unit.

Further, the boss portion 11 (diameter D8), in the state where the boss portion 20 of the displacing stand 6 is in contact with the inner surface of the hole 8, is positioned in such a manner as the outer circumference of the back plate 22 does not contact to the boss portion 11. When such displacing allowance of the displacing stand 6 is represented in a formula, it becomes following, $$((P2-D8)/2 > D2 > D3.$$

Further, if the displacing stand 6 is displaced on the ball 10, and when the inside of the side edge 17 (diameter D5) gets in touch with the ball receptor 9, a smooth movement of the displacing stand 6 due to the balls is lost, so that in order to avoid the inner surface of the side edge 17 from getting in touch with the ball receptor 9, the diameter D3, the diameter D2 of the hole 8 and the pitch circle diameter P1 are determined. The displacing allowance is represented by the following formula.

$$(D5-(P1+D6))/2 > D2-D3$$

That is, in the state where the displacing stand 6 is displaced and the boss portion 20 gets in touch with the inner surface of the hole 8, the inner surface of the side edge 17 is adapted to be kept out of the ball receptor 9.

Thereby, the boss portion 20 can be displaced free in the hole 8 and the displacing area of the displacing stand 6 is made to be limited.

Further, the inner diameter D7 is made to be a little larger than the diameter D1 of the ball 10, and its depth H6 is equal to the radius of the ball 10 or a little smaller than it. Thereby the ball 10 can be rolled smoothly in the ball receptor 9.

Further, the assembly working of the arm support is carried out simply by putting the balls 10 in the ball receptors 9 on the fixed stand 5 and the displacing stand 6 is covered with the displacing stand 6. Next, the back plate 22 is connected to the boss portion 20 with the screw 24. And, the bottom plate 12 is attached to the lower surface 25 of the fixed stand 5 and connected to the boss portion 11 with the screw 16.

As shown in FIG. 2, in the case the fixed stand 5 and the displacing stand 6 are formed in a unitary manner, by shortening the height H2 of the side edge 17 of the displacing stand 6 or designing the diameter D1 of the ball 10 larger to generate a tiny gap. Further, as shown in FIG. 5, by disposing the ball receptors 9 around the hole 8 at a regular angle on the pitch circle diameter P1, in the state where the boss portion 20 gets in touch the inner circumference of the hole 8, that is the displacing stand 6 is most shifted, the inclination of the displacing stand 6 may be gotten rid of. Further, also by getting the back plate 22 in touch with the lower surface 25 of the fixed stand 5, the inclination of the displacing stand 6 is prevented.

Next, the operation of the arm support 4 is explained.

As mentioned above, in this arm support 4, since, by interposing the balls between stand 6 and the fixed stand 5, the displacing of the boss portion 20 provided on the displacing stand 6 may be free in the hole 8 provided on the fixed stand 5, while letting the displacement of the displacing stand 6 free, limiting the displacement area of the displacing stand 6 and the displacing stand 6 and the fixed stand 5 are made in a unit, the balls 10, the boss portion 20, the hole 8 and the back plate 22 can be accommodated inside the displacing stand 6 and the fixed stand 5, and as a result the displacing area of the displacing stand 6 can be widened and the apparatus can be miniaturized.

Further, as shown in FIGS. 1 and 2, when operating a mouse by putting the arm on a pad 19 of the on the displacing stand 6, the displacing stand 6 moves as follows.

That is, since the displacing stand 6 is supported on the fixed stand 5 through the balls 10, to the horizontal movement of the arm, the displacing stand 6 is displaced in parallel in the plane and at the time of the left or right movement of the hand to move the mouse, the direction of the displacing stand 6 follows the hand by rotation of the displacing stand 6. In addition, depending on the movement of the arm, while letting the displacing stand 6 to rotate in the plane, it can be made to be displaced in parallel.

Figure 6:
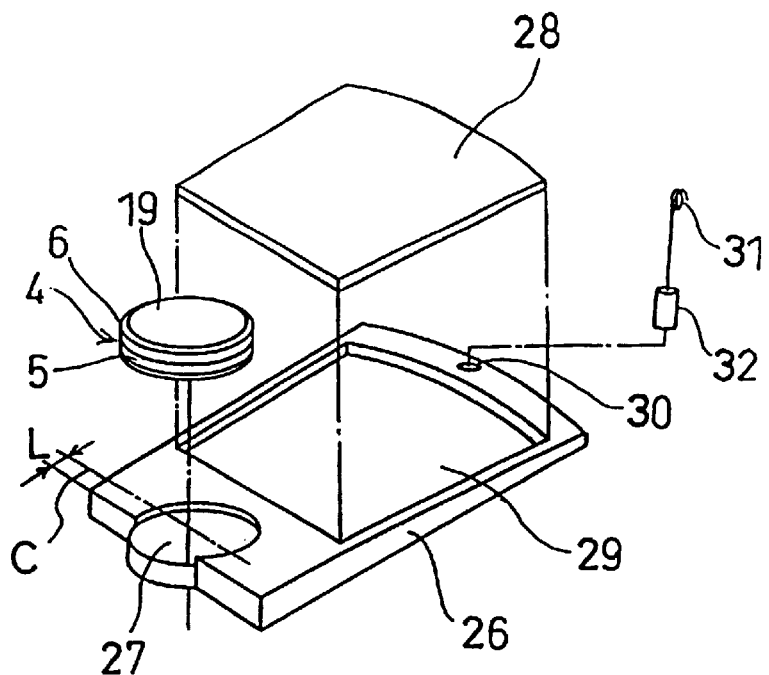
FIG. 6 is a broken perspective view of the pad for mouse using the arm support of the present invention.
Figure 7:
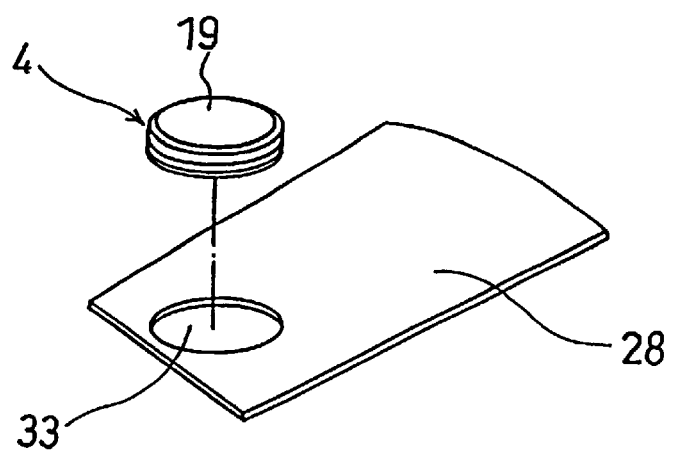
FIG. 7 is a broken perspective view of the other pad for mouse using the arm support of the present invention.

Next, one embodiment of a pad for mouse is explained referring to FIGS. 6 and 7. In the embodiment shown in FIG. 6, the arm support 4 is circular and on end of a plane plate-like pad stand 26, a partially cut out and recessed portion 27 for being coupled with the arm support 4 is provided. That is, the recessed portion 27 for the arm support 4 is cut out at the portion of line L departed in parallel from the center line C passing the center of the recessed portion 27. Further, the depth of the recessed portion 27 is arranged in such a manner as the displacing stand 6 does not get in touch with the side wall of the recessed portion, and so that, the size of the depth is at last smaller than the height of the fixed stand 5.

Accordingly, in the state where the arm support 4 is coupled with the recessed portion 27, one portion of the arm support 4 is adapted to be projected from the recessed portion 27 for arm support 4. By this construction, the coupling or removal of the arm support 4 in the recessed portion 27 becomes easy and the arm support 4 is prevented from removing from the recessed portion 27 in a horizontal direction.

Further, in the pad stand 26, a recessed portion 29 for the pad is provided in order to hold the pad body 28 adjacent to the recessed portion 27. And, by coupling the arm support 4 with the recessed portion 27 and coupling the pad body 28 with the recessed portion 29 for the pad, the arm support 4 and the pad body 28 are unified adjacently with each other, and by putting the arm on the arm support 4 which is possible to be displaced in parallel and rotated in the plane, the operation of the mouse on the pad body 28 can be easily carried out.

Further, a supporting hole 30 is provided on the periphery of the recessed portion 29 for pad, in which a proximal end 32 of the mouse cord holder member 31 is inserted and provided removably the mouse cord holder member 31 therein.

The pad body 28 shown in FIG. 7, is of the structure which is provided with a circular opening 33 on one end thereof so as to couple the arm support 4, and the arm support 4 and the pad body 28 are connected in a unitary manner, thereby it is possible that an arm is put on the arm support 4 which is possible to be displaced in parallel and rotated in the plane and the arm can be arbitrarily displaced to operate the mouse easily on the pad body 28.

Figure 8:
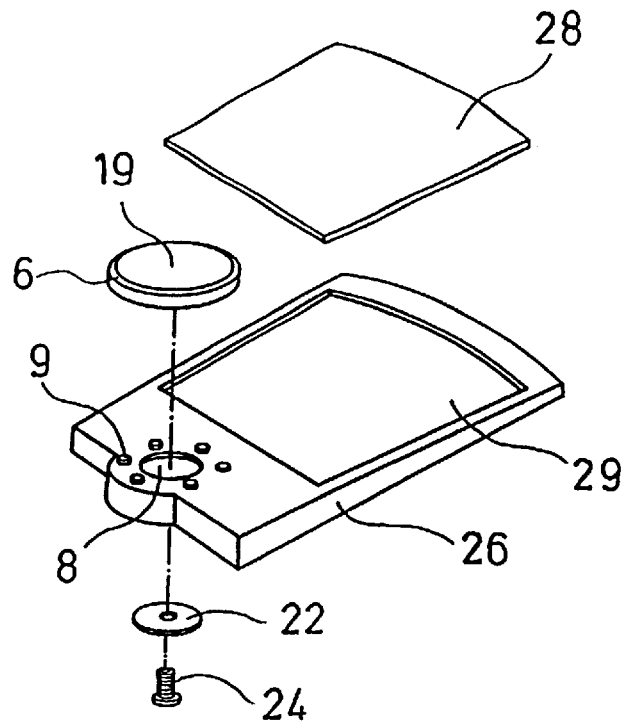
FIG. 8 is a broken perspective view of the pad for mouse using another embodiment of the present invention.
Figure 9:
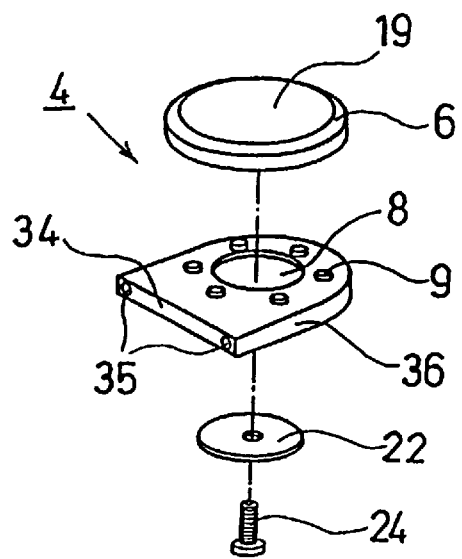
FIG. 9 is a broken perspective view of another embodiment of the arm support of the present invention.

Next, another embodiment of the arm support 4 is explained referring to FIGS. 8 and 9. In the embodiment shown in FIG. 8, the pad stand 26 is formed by connecting the fixed stand 5 to a member having the recessed portion 29 for pad in a unitary manner. And, on one end of the pad stand 26 a hole 8 is provided, around which a plurality of ball receptors 9 are disposed directly on the pad stand 26. In these ball receptors the balls 10 (not shown) are accommodated to support the displacing stand 6. Further, the displacing stand 6 is provided with the boss portion 20 (not shown) projected downward from the central portion of the bottom of the displacing stand 6 and the back plate 22 having a diameter larger than the hole 8 is fixed to the lower end of the boss portion 20 at a portion lower than the pad stand 26 to be formed in a unitary manner.

By this, the mechanism which displaces the displacing stand 6 in the plane is adapted to become as well as in the arm support 4 as shown in FIG. 2. Now, in the state where the displacing stand 6 is assembled, a tiny gap is generated under the side edge 17 of the displacing stand 6. Further, the pad body 28 is held by the recessed portion 29 for pad adjacent to the displacing stand 6. In this arm support 4, merely the fixed stand 4 becomes large and the pad body is affixed, and since the size becomes large, the management becomes easy.

Further, although the boss portion of the displacing stand 6 is omitted in FIG., it can be displaced free in the hole 8 and even though the back plate 22 is displaced, it is structured in such a manner as the back plate 22 does not get in touch with the inside of the side edge of the pad stand 26 to enable the displacing stand 6 to displace free therein. Thereby, by putting the arm on the displacing stand 6, it is possible to operate easily the mouse on the pad body 28.

Further, as well as what is shown in FIG. 6, a supporting hole 30 is provided on the periphery of the recessed portion 29 for pad, and the proximal end 32 of the mouse cord holder member 31 may be inserted to provide the mouse cord holder member 31 removably.

Further, in the other embodiment shown in FIG. 9, one portion of the side edge 7 of the fixed stand 5 is formed as a linear-like side 34 and to that side 34 is provided with mounting holes 35 for a fixing device to constitute a fixing base 36, on the fixing base 36 a plurality of ball receptors 9 are disposed annularly and the hole 8 is provided at the center of the annular receptors 9 and through the balls (not shown) accommodated in the ball receptors the displacing stand 6 is arranged to form the arm support 4. The fixing device mounting holes 35 are mounted with fixing device 37 (FIG. 12).

And, at the center of the displacing stand 6, the boss portion 20 (not shown) is projected downward and the back plate 22 having a diameter larger than the diameter of the hole 8 is fixed to the boss portion 20. The displacing range of the displacing stand 6 is arranged in a condition identical to the previous one, and since the fixed base 36 is fixed on such as table 38 (FIG. 12), a stable feeling is increased in the displacing stand 6 on which an arm is placed.

Figure 10:
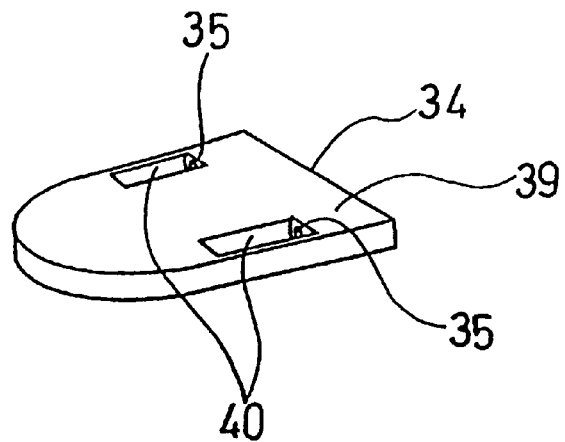
FIG. 10 is a perspective view showing the back of the placing stand of the arm support of another embodiment of the present invention.
Figure 11:
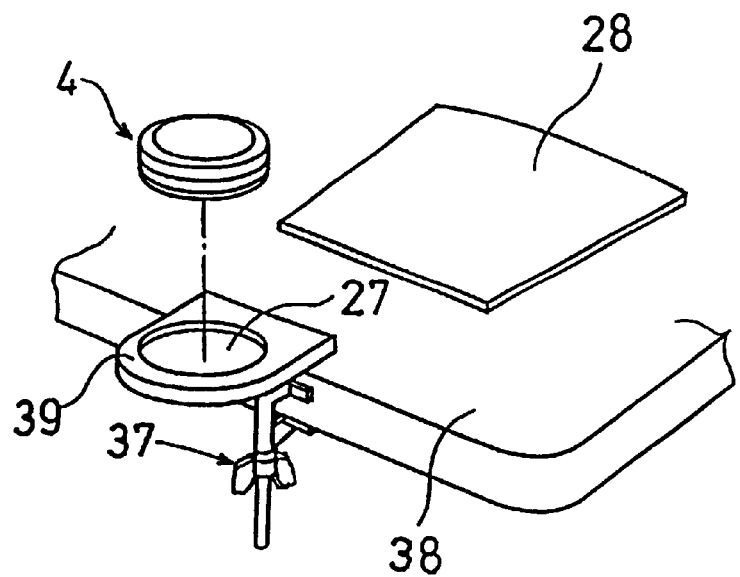
FIG. 11 is a perspective view showing the fixed stand of the arm support using the placing stand of FIG. 10.
Figure 12:
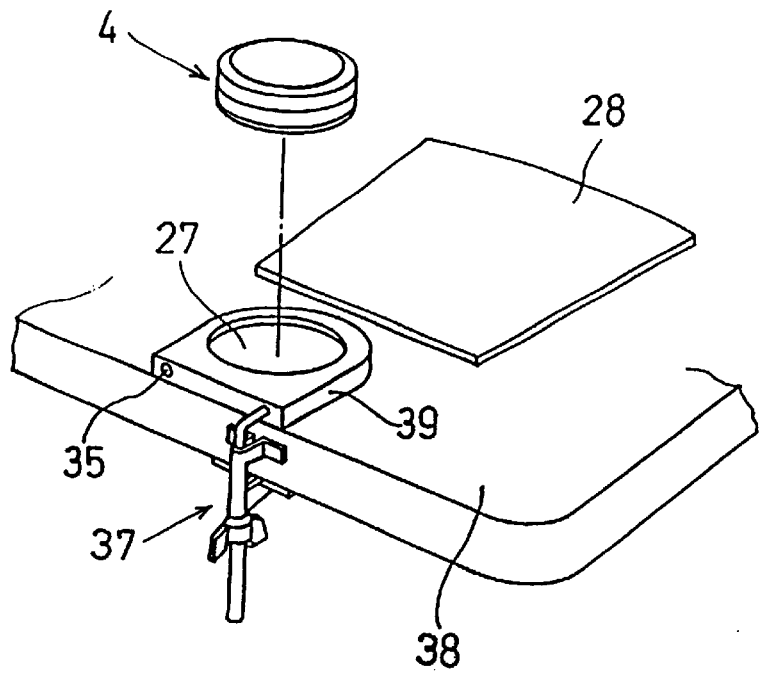
FIG. 12 is a perspective view showing the fixed stand of the arm stand using the other placing stand.

Next, an embodiment of a placing stand to place the arm support 4 is explained referring to FIGS. 10, 11 and 12. A placing stand 39 shown in FIG. 10 is provided with a pair of recessed portions 40 on the rear surface thereof, and on a wall surface of the side face 34 formed with the recessed portion 40 the fixed device mounting hole 35 is provided in such a manner the side face 34 is pierced.

Further, on the surface of the placing stand 39 as shown in FIG. 11, and on the surface of the placing stand 39 shown in FIG. 12, a recessed portion 27 is provided for placing the arm support 4 and the fixing device mounting hole 35 is provided on the side 34.

In the placing stand 39 shown in FIG. 11, the arm support 4 is coupled with the recessed portion 27, provided on the placing stand 39 end portions of the fixed device 37 are inserted in the fixed device mounting hole 35, thereby the placing stand 39 is fixed on the table 38 by the fixed device 37. In this case, the pad body 28 is placed on the table 38 near the placing stand 39. Since the placing stand 39 shown in FIG. 11 is, as shown in FIG. 10, provided with a pair of recessed portions 40, is fixed in the state projected from the table 38.

Further, the placing stand 39 shown in FIG. 12 can be fixed on the table 38 so as not to be projected from the table 38.

Depending on a situation, with a preferableposture for working an operation of the mouse can be carried out using one of the two kind of placing stand.

By placing the pad body 28 on the most suitable location in connection with the arm support 4, it is possible to operate a mouse on the table 38 easily by putting the arm on the arm support 4 which is possible to be displaced in parallel and rotated. For reference, in FIGS. 11 and 12, it is shown in the case where one fixing device 38 is used for fixing the arm support 4, but it may be also possible to use two fixing devices for securing the fixing.

Next, referring to FIGS. 13 to 17, another embodiment of the arm support 4 of the present invention is explained.

Figure 13:
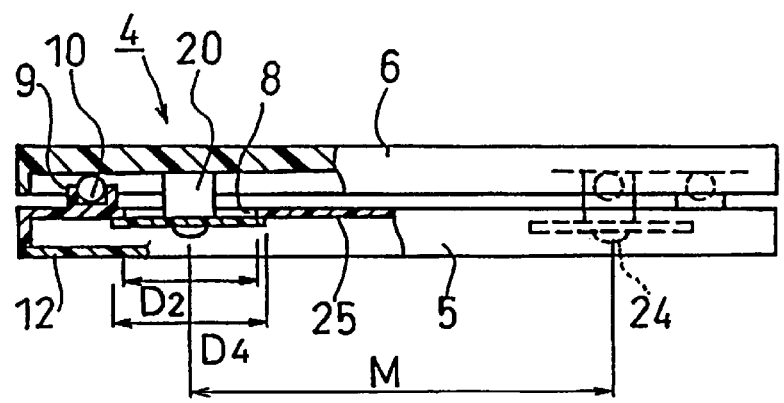
FIG. 13 is a vertical view of the arm support in section of the another embodiment of the present invention.
Figure 14:
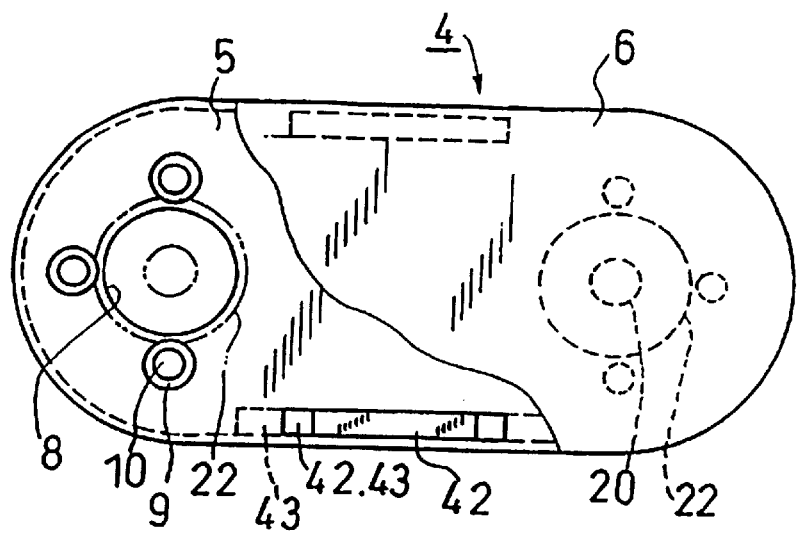
FIG. 14 is a plan view of the arm support of FIG. 13.

The arm support 4 shown in FIGS. 13 and 14, a plane on which an arm is put is formed oval, and the fixed stand 5 and the displacing stand 6 are also formed oval. Accordingly, the displacing stand 6 has two circular areas, at each center of which the boss portion 20 is provided. One the fixed stand 5, two openings 8 (diameter D2), each center of which corresponds to the boss portions 20, are formed, and the back plate 22 having the diameter (D4) larger than the opening 8 is fixed by the screw 24 to the end of the boss portion 20 in such a manner as it becomes close to the rear surface 25 of the fixed stand 5.

Further, around each of the openings 8, on an each semi-circular side of the arm support 4, a plurality of ball receptors are disposed in a semi-circular state, and the displacing stand 6 is supported by all of the balls in the ball receptors.

Figure 16:
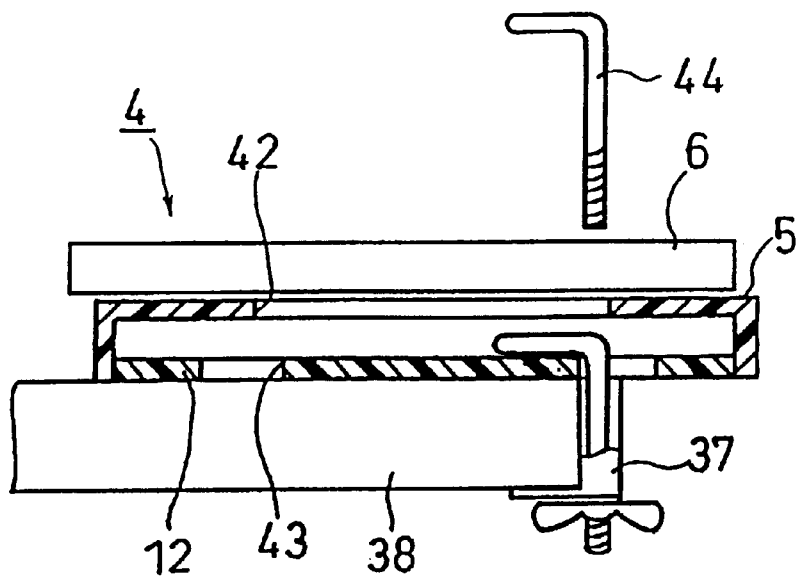
FIG. 16 is a vertical view in section showing the assembling structure of the arm support of FIG. 13.

As shown in FIGS. 14 and 16, in both of linear-like sides of the arm support 4, on an upper surface thereof inserting holes 42 are formed, and on a lower bottom 12 lower located is provided with a mounting hole 43 is formed.

Figure 15:
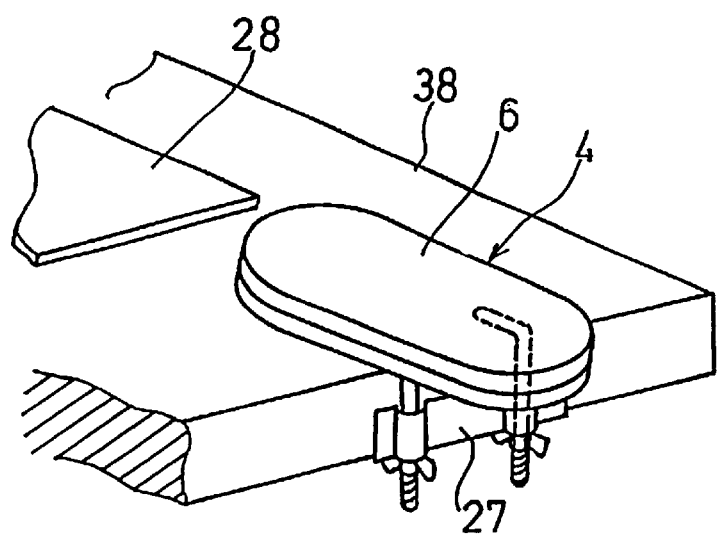
FIG. 15 is a perspective view showing the assembling state of the arm support of FIG. 13.

As shown in FIGS. 15 and 16, in order to fix the arm support 4 on the table 38, by exposing the inserting hole 42 by shifting the fixed stand 5 and displacing stand 6 with each other, a L-metal 44 of the fixing device 37 is inserted from the inserting hole 42 in the mounting hole 43. And, by clamping the table 38 by the fixing device 37.

When an operator of the mouse sits opposing to the table 38 and the elbow is located far from the table 38, it is preferable to locate the arm support 4 a little projected from the table 38 for easy positioning of the arm and operating the mouse.

Further, it is possible to position the arm support 4 turning at 90 degrees to the table 38. In this case, the longitudinal side of the arm support 4 is made to be disposed along the table 38, after inserting the L-metal 44, by changing its direction to the table 38 side and it may be set on the table 38 by the fixed device 27.

Figure 17:
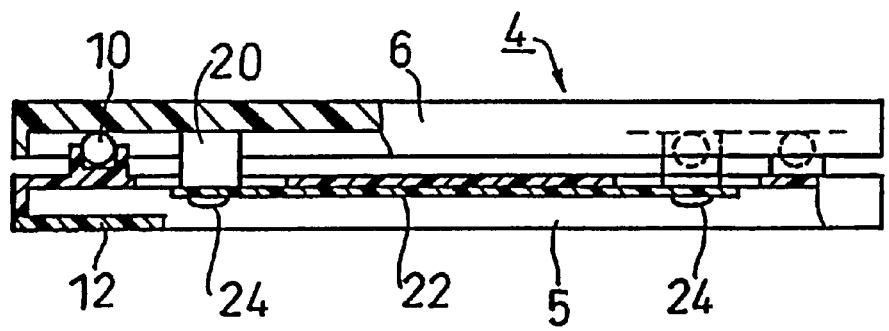
FIG. 17 is to show the another embodiment of the arm support partly in section.
Figure 18:
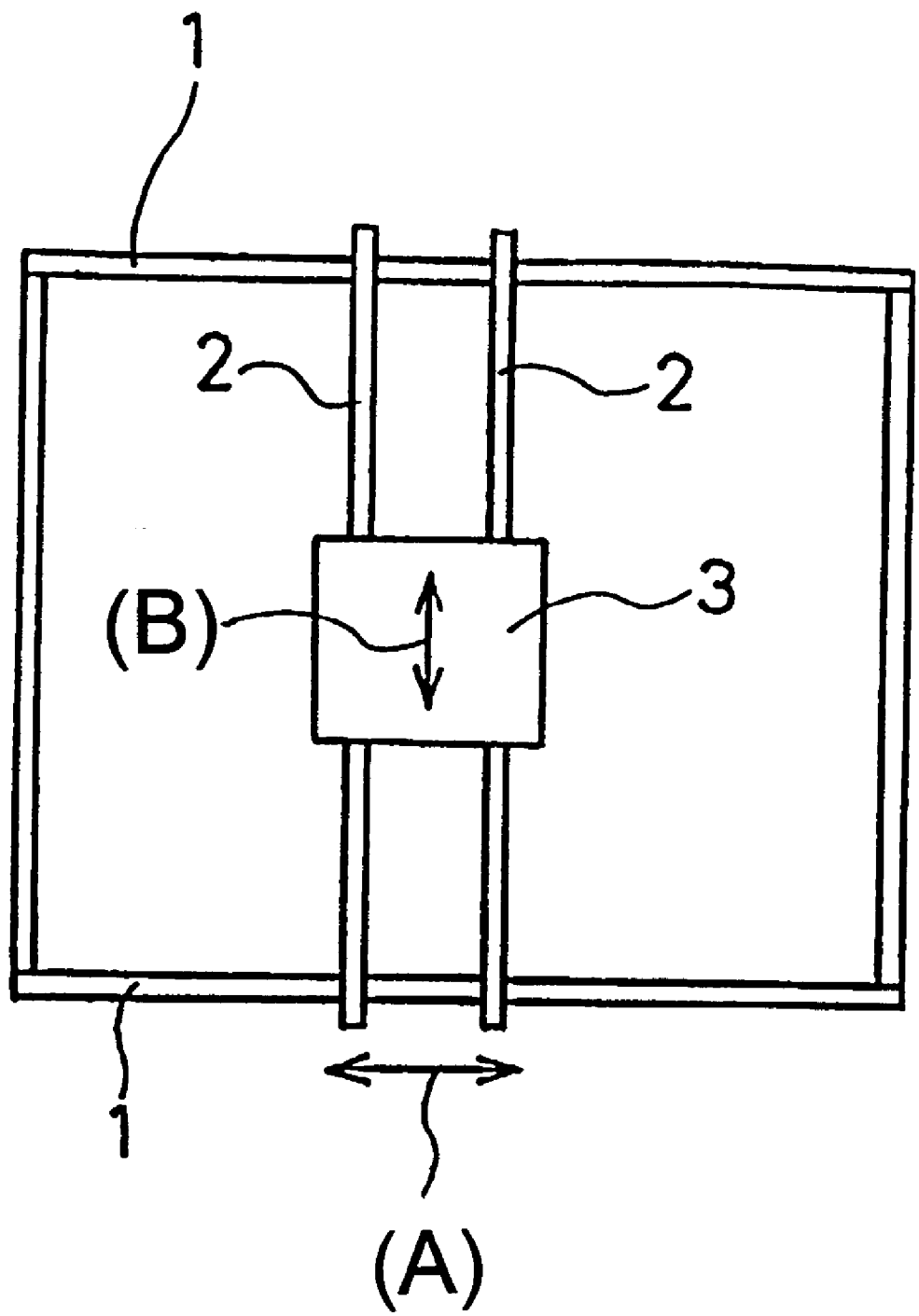
FIG. 18 is a plan view of the arm support of the conventional art.

The arm support 4 shown in FIG. 17, in place of fixing two back plates 22, is provided with a longitudinal back plate 22 between the boss portions 20 (spacing M). Thereby, notwithstanding the size of the opening 8, it may assembled and the fixed stand 5 and the displacing stand 6 are secured to be connected. For reference, if the two openings of the arm support 4 become one by being connected, a weight lightening is realized.

The present invention as is explained above, and according to the first aspect of the present invention, since the displacing stand of the arm support is possible to displace in parallel with the fixed stand and the displacing stand itself is possible to be rotated and the load of the displacing stand is supported by the balls, it is possible to move the arm put on the displacing stand free resulting in an easy operation of the mouse.

Further, due to the boss portion of the displacing stand and due to the opening, back plate and fixed stand, arm support is formed in a unitary manner to ease the handling. Further, since the boss portion of the displacing stand displaces free within the hole of the fixed stand, the inclining of the displacing stand is prevented from occurring at the end portion, and within the displacing region of the boss portion the arm is free to move. In addition, it is possible to miniaturize the device since the balls, the boss portions and the holes to make the fixed stand and the displacing stand shifted with each other are accommodated between the fixed stand and the displacing stand.

According to the second aspect of the present invention, in the first aspect, since a plurality of boss portions are provided, the surface to receive the load approxipadely even becomes widened, not only the elbow but also the portion from the wrist to the elbow, that is an arm can put thereon, the usability degree is widened.

According to the third aspect of the present invention, in the first or second aspect of the present invention, the fixed stand and the displacing stand is separated a little bit, thereby conflicting of the fixed stand and the displacing stand is prevented to enable the arm to move smoothly.

According to the fourth aspect of the present invention, in the invention of the aspect 1 or 2, the fixed stand can be mounted on the operation surface of the mouse, a smooth displacing can be carried out, without moving the fixed stand due to the load of the arm, the operation of a series of the wrist, elbow and shoulder are connected preferably, the displacement of the arm becomes smooth and the operation of the mouse becomes smooth to minimize the fatigue of the arm and increase the working efficiency.

According to the fifth aspect of the present invention, in the pad for mouse using an arm support, the arm support and the pad body are connected adjacently to the pad stand, and a stand-by for a work becomes easy.

According to the sixth aspect of the present invention, since the pad body is placed on the mouse operating surface and into the hole of the pad body the arm support is put, to reduce the number of parts and ease the working stand-by.

According to the seventh aspect of the present invention, the pad for mouse equivalent to the large scale of the arm support to ease the working stand-by and simplify the management.

According to the eighth aspect of the present invention, since, on the operation surface, the placing stand is fixed, due to setting the arm support to the recessed portion for the arm support, it is possible to displace the displacing stand stably, and dispose the pad body to an appropriate position, it becomes easy depending on the nature of each individual to operate the mouse to reduce the fatigue of the arm to increase the working efficiency.

What is claimed is:

1. An arm support, comprising:
   a fixed stand, the fixed stand having at least one through hole, the fixed stand having a first upper surface and a first lower surface;
   a plurality of balls disposed on the first upper surface of the fixed stand;
   a pad;
   a displacing stand, the displacing stand having a second upper surface and a second lower surface, the second upper surface being shaped for easily affixing the pad, the displacing stand having at least one boss portion on the second lower surface, the at least one boss portion extending downwards in a direction perpendicular to the second lower surface, the at least one boss portion having a diameter that is substantially smaller than the diameter of the at least one through hole in the fixed stand;
   a bottom plate;
   at least one back plate, the at least one back plate having a through hole at its approximate center, the at least one back plate having an outer diameter that is greater than the diameter of the through hole in the fixed stand;
   at least one fastener that fixes the fixed stand to the bottom plate; and
   at least one fastener that fixes the at least one back plate to the boss portion of the displacing stand, such that the at least one back plate is on the first lower surface of the fixed stand, the second lower surface of the displacing stand faces the first upper surface of the fixed stand, the at least one boss portion of the displacing stand extends through the at least one through hole in the fixed stand, and the at least one boss portion of the displacing stand moves freely within the at least one through hole in the fixed stand.

2. The arm support according to claim 1, wherein at least one boss portion comprises two boss portions and the at least one through hole comprises two through holes.

3. The arm support according to claim 2, wherein the fixed stand is provided with a mounting portion to mount the fixed stand on a placing stand.

4. The arm support according to claim 1, wherein a lower end of the boss portion is slightly below the first lower surface of the fixed stand.

5. An arm support according to claim 1, wherein the fixed stand is provided with a mounting portion to mount the fixed stand on a placing stand.

6. The arm support according to claim 1, wherein the fixed stand is provided with a mounting portion to mount the fixed stand on a placing stand.

* * * * *